Oct. 14, 1924.
M. B. HILL
1,511,885
LINING FOR TRANSMISSION BANDS
Filed Nov. 13, 1922
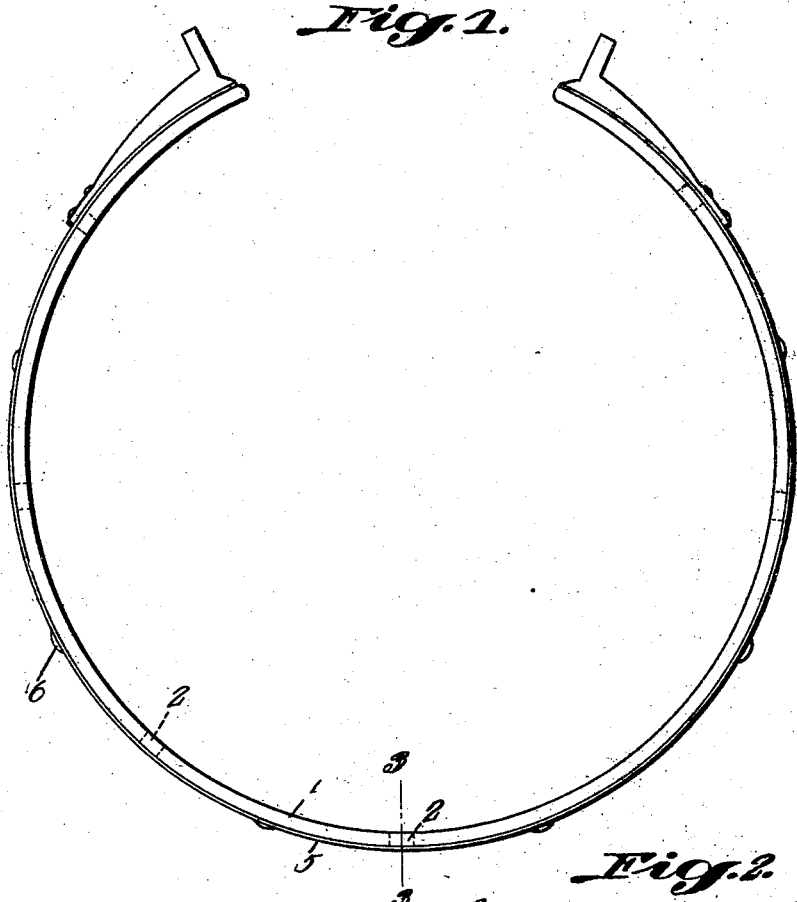
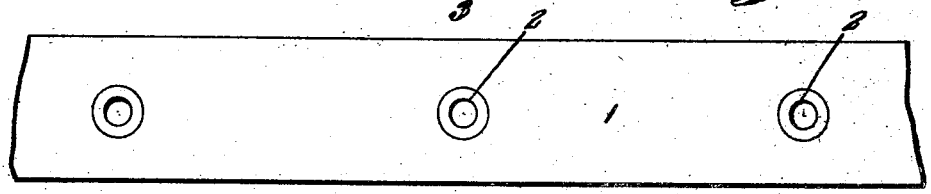
M. B. Hill, Inventor

Patented Oct. 14, 1924.

1,511,885

UNITED STATES PATENT OFFICE.

MARTIN B. HILL, OF HOUSTON, TEXAS.

LINING FOR TRANSMISSION BANDS.

Application filed November 13, 1922. Serial No. 600,603.

*To all whom it may concern:*

Be it known that I, MARTIN B. HILL, a citizen of the United States, residing at Houston, in the county of Harris and State of Texas, have invented a new and useful Lining for Transmission Bands, of which the following is a specification.

This invention relates to linings for transmission bands for automobiles.

The object of the invention is to provide a lining of this character so constructed that smooth starting and stopping of a car may be effected at all times.

Another object is to so construct a lining of this character that it will not become slick and non-absorbent of oil, and which will keep the transmission drum oiled, thereby ensuring a smooth application and release of the bands and the life of which is greatly in excess of the ordinary transmission bands and by the use of which the life of the drum is greatly prolonged.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a transmission brake band with this improved lining shown applied.

Fig. 2 is a plan view of a portion of the lining constituting this invention, and Fig. 3 is a transverse section taken on the line 3—3 of Fig. 1.

In the embodiment illustrated, the transmission band lining 1 which embodies this invention is constructed of the usual fabric employed for this purpose and has inserted therein at longitudinally spaced intervals, a plurality of grommets 2 which form metal lined oil cups 3 in the lining as is shown clearly in Fig. 3, open at the outer or front face of the lining and closed at the inner or rear face thereof by the metal brake band.

The lining 1 is secured to the band 5 in the usual manner by means of rivets 6 and the oil cups 3 are arranged to alternate with the rivets as herein shown, although obviously they may be otherwise arranged if found desirable.

From the above description it will be obvious that a lining equipped with the oil cups 3 arranged throughout the entire length thereof will effectively receive and retain oil thrown up from the crank case by the rotation of the brake drum, which oil will be returned to the face of the drum when the brake is applied and prevent the brake from grating and grabbing. When the brake is released the cups will be refilled and the operation repeated. The oil on the drum also retains the bands in soft absorbent condition and prevents them from burning and getting hard and slick as is customary with bands of this character after they have been used some time.

This oil carrying lining ensures a smooth engagement of the brake band with the drum without any jerking or chattering and thus prevents injury to the mechanism of the car.

The grommets or eyelets 2 which form the oil cups 3 have large heads or clamping flanges as shown clearly in Figs. 2 and 3 to prevent the eyelets from working out of the lining and which are embedded in the lining fabric.

The application of the brake seals the oil in cups 3 and if there is any slip of the brake the oil is pulled out from the cups by a vacuum which will form on the smooth surface of the brake drum when rotated.

I claim:

The combination with an imperforate transmission band; of a lining therefor having metal lined apertures extending therethrough from face to face and closed at the rear face of said lining by said band whereby oil cups are formed to receive oil on the rotation of the brake drum, the oil being sealed in said cups on the application of the brake and pulled out onto the drum by vacuum should slippage occur between the drum and the brake.

In testimony that I claim the foregoing as my own, I have hereto affixed my signature in the presence of two witnesses.

MARTIN B. HILL.

Witnesses:
  ROY C. ORR,
  W. D. WOOD.